(12) United States Patent  (10) Patent No.: US 8,066,435 B2
Miyata et al.  (45) Date of Patent: Nov. 29, 2011

(54) STRUT SLIDING BEARING

(75) Inventors: Kazuyuki Miyata, Fujisawa (JP);
Ryohei Kaneko, Fujisawa (JP)

(73) Assignee: Oiles Corporation, Tokyo (JP)

( * ) Notice: Subject to any disclaimer, the term of this patent is extended or adjusted under 35 U.S.C. 154(b) by 778 days.

(21) Appl. No.: 10/549,360

(22) PCT Filed: Feb. 26, 2004

(86) PCT No.: PCT/JP2004/002272
§ 371 (c)(1),
(2), (4) Date: Sep. 14, 2005

(87) PCT Pub. No.: WO2004/085864
PCT Pub. Date: Jul. 10, 2004

(65) Prior Publication Data
US 2006/0215945 A1 Sep. 28, 2006

(30) Foreign Application Priority Data
Mar. 25, 2003 (JP) .................. 2003-083747

(51) Int. Cl.
*F16C 17/04* (2006.01)
*B60G 15/00* (2006.01)
(52) U.S. Cl. .. 384/420; 384/228; 384/297; 280/124.147
(58) Field of Classification Search .............. 384/228, 384/297, 299, 300, 303, 368, 420, 422, 425; 267/220; 280/124, 155, 124.155, 124.145, 280/124.147
See application file for complete search history.

(56) References Cited

U.S. PATENT DOCUMENTS

| 4,239,301 A | 12/1980 | Pannwitz |
| 4,854,745 A | 8/1989 | Kamimura et al. |
| 4,907,289 A | 3/1990 | Kamimura et al. |
| 4,923,312 A | 5/1990 | Kamimura et al. |
| 4,969,752 A | 11/1990 | Kubota et al. |
| 5,476,326 A * | 12/1995 | Ueno et al. .................. 384/125 |
| 6,257,605 B1 * | 7/2001 | Zernickel et al. ...... 280/124.147 |

(Continued)

FOREIGN PATENT DOCUMENTS

JP 11-13767 A 1/1999

(Continued)

OTHER PUBLICATIONS

Microfilm of the specification and drawings annexed to the request of Japanese Utility Model Application No. 46110/1989 (Laid-open No. 136811/1990), Nov. 15, 1990.

(Continued)

*Primary Examiner* — James Pilkington
(74) *Attorney, Agent, or Firm* — Nixon & Vanderhye P.C.

(57) ABSTRACT

A thrust sliding bearing (1) includes an upper casing (3) which is made of polyacetal resin and has an annular lower surface (2); a lower casing (5) which is made of a reinforced synthetic resin including, in addition to polyacetal resin, reinforcing fibers such as glass fibers contained in this polyacetal resin, is superposed on the upper casing (3) so as to be rotatable about an axis O of the upper casing (3) in an R direction, and has an annular upper surface (4) opposed to the annular lower surface (2) of the upper casing (3); an annular thrust sliding bearing piece (6) which is made of polyacetal resin and is interposed between the annular lower surface (2) and the annular upper surface (4); and a tubular radial sliding bearing piece (7) made of polyacetal resin.

17 Claims, 5 Drawing Sheets

U.S. PATENT DOCUMENTS

| | | | |
|---|---|---|---|
| 6,918,701 B2 * | 7/2005 | Ueno et al. | 384/420 |
| 7,000,909 B2 * | 2/2006 | Kellam et al. | 267/221 |
| 2003/0002764 A1 * | 1/2003 | Pflugner et al. | 384/609 |
| 2003/0137091 A1 | 7/2003 | Chesne | |

FOREIGN PATENT DOCUMENTS

| | | | |
|---|---|---|---|
| JP | 2001-99218 A | | 4/2001 |
| JP | 2001-27227 | * | 9/2001 |
| JP | 01/92040 A1 | | 12/2001 |
| JP | 2002-257146 A | | 9/2002 |
| JP | 2003-535740 | | 12/2003 |

OTHER PUBLICATIONS

International Search Report of PCT/JP2004/002272, mailed May 25, 2004.

* cited by examiner

F I G. 1
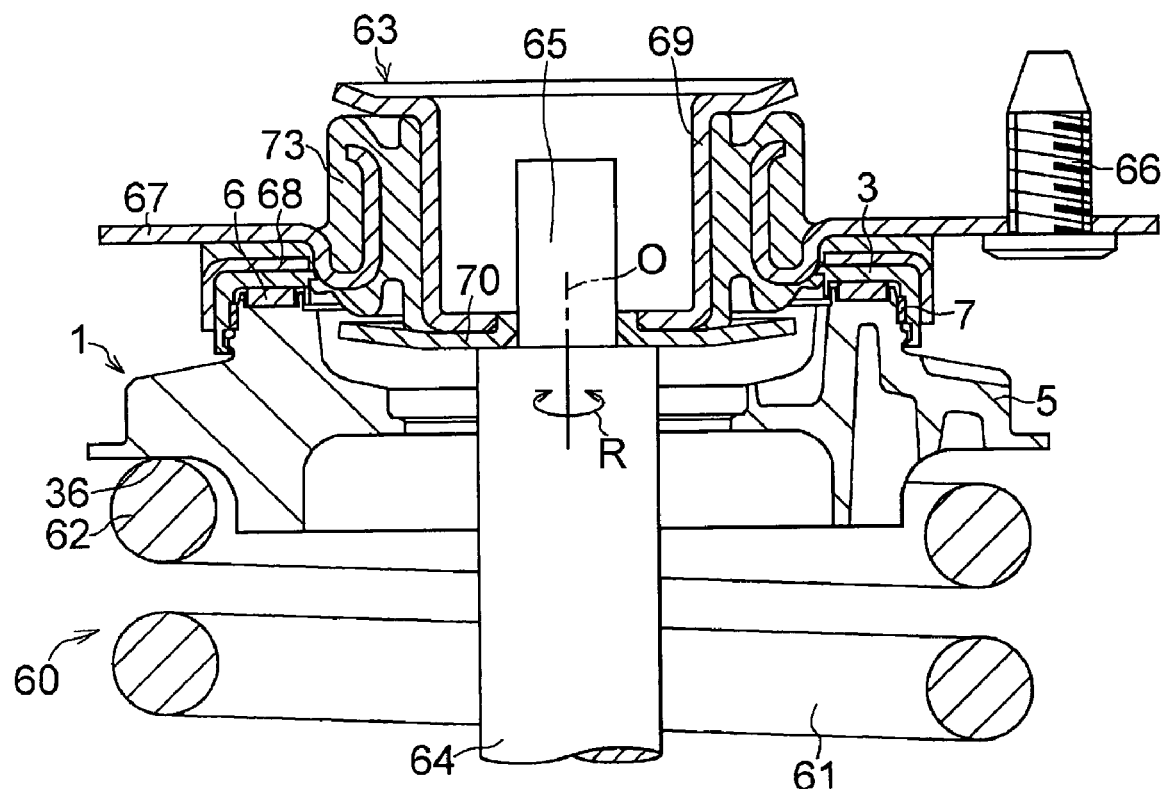

US 8,066,435 B2

STRUT SLIDING BEARING

This application is the US national phase of international application PCT/JP2004/002272, filed 26 Feb. 2004, which designated the U.S. and claims priority of JP 2003-083747, filed 25 Mar. 2003, the entire contents of each of which are hereby incorporated by reference.

TECHNICAL FIELD

The present invention relates to a strut sliding bearing, and more particularly to a strut sliding bearing which is suitably incorporated as a sliding bearing of a strut-type suspension (Macpherson type) in a four-wheeled motor vehicle.

BACKGROUND ART

In general, a strut-type suspension is mainly used in a front wheel of a four-wheeled motor vehicle, and is constructed such that a strut assembly incorporating a hydraulic shock absorber in an outer cylinder formed integrally with a main shaft is combined with a suspension coil spring. Among such suspensions, there is a type of structure in which the axis of the suspension coil spring is actively offset with respect to the axis of the strut, so as to allow the sliding of a piston rod of the shock absorber incorporated in the strut to be effected smoothly. There is another type of structure in which the suspension coil spring is disposed by aligning the axis of the suspension coil spring with the axis of the strut. In either structure, a thrust bearing is disposed between a mounting member for a motor vehicle body and an upper spring seat member of the suspension coil spring to allow the rotation to be effected smoothly when the strut assembly rotates together with the suspension coil spring by the steering operation.

In this thrust bearing, a rolling bearing using balls or needles, or a synthetic resin-made sliding bearing is used. The rolling bearing is extremely favorable since it is capable of lowering the friction torque and effecting the steering operation lightly. However, since the rolling bearing is expensive, in a case where a low price is required, a sliding bearing instead of the rolling bearing is used as the thrust bearing.

Incidentally, either thrust bearing is interposed between the mounting member for the motor vehicle body and the upper spring seat member of the suspension coil spring, as described above. However, since the upper spring seat member is generally made of sheet metal, the upper spring seat member is relatively heavy. In addition, as a result of the fact that the upper spring seat member made of sheet metal needs to be provided with coating for the prevention of rust, even if the sliding bearing is used instead of the expensive rolling bearing to attain the light weight and a low price of the undercarriage of the motor vehicle, there is a limit to such attempts for the light weight and the low price owing to the weight, manufacturing cost, assembly cost, and the like of the upper spring seat member.

The present invention has been devised in view of the above-described aspects, and its object is to provide a strut sliding bearing which makes it possible to omit the upper spring seat member made of sheet metal, thereby making it possible to attain the light weight and a low price of the undercarriage of a motor vehicle.

DISCLOSURE OF THE INVENTION

A strut sliding bearing in accordance with a first aspect of the invention comprises: an upper casing made of a synthetic resin and having an annular lower surface; a lower casing which is made of a synthetic resin, is superposed on the upper casing so as to be rotatable about an axis of the upper casing, and has an annular upper surface opposed to the annular lower surface of the upper casing; and an annular thrust sliding bearing piece which is made of a synthetic resin, and is interposed between the annular lower surface and the annular upper surface, wherein the lower casing has on a lower surface thereof a spring seat surface for a suspension coil spring.

According to the strut sliding bearing in accordance with the first aspect, since the upper casing, the lower casing, and the thrust sliding bearing piece are made of a synthetic resin, it is possible to sufficiently attain light weight and a low price. Moreover, since the lower casing has at its lower surface the spring seat surface for the suspension coil spring, one end portion of the suspension coil spring can be received by the lower casing, making it possible to omit an upper spring seat member made of sheet metal. Thus, it is possible to eliminate a weight increase ascribable to the upper spring seat member made of sheet metal and a price increase ascribable to such as the fabrication, coating, and assembly of the upper spring seat member made of sheet metal. Coupled with the above-described advantages, it is possible to further attain the light weight and a low price of the undercarriage of the motor vehicle.

The strut sliding bearing in accordance with the invention essentially suffices if it functions as a thrust bearing, but the strut sliding bearing may further comprise a tubular radial sliding bearing piece as in the strut sliding bearing in accordance with a second aspect of the invention. In this case, the upper casing includes an upper annular portion with the annular lower surface formed thereon and a cylindrical portion extended integrally downward from a radially inner peripheral edge or outer peripheral edge of the upper annular portion and having a cylindrical side surface, the lower casing having a cylindrical side surface opposed to the cylindrical side surface, the radial sliding bearing piece being interposed between the cylindrical side surface of the cylindrical portion of the upper casing and the cylindrical side surface of the lower casing.

According to such a strut sliding bearing in accordance with the second aspect, as a result of the fact that the radial force applied between the lower casing and the upper casing can be received by the radial sliding bearing piece, even if the radial force is applied, the relative rotation between the lower casing and the upper casing can be effected with low frictional resistance. Thus, the steering operation can be performed lightly.

The cylindrical portion of the upper casing suffices if it extends integrally downward from the radially inner peripheral edge or outer peripheral edge of the upper annular portion. Alternatively, however, such a cylindrical portion may extend integrally downward from both of the radially inner peripheral edge and outer peripheral edge of the upper annular portion.

As in the strut sliding bearing in accordance with a third aspect of the invention, the lower casing includes an inner peripheral-side cylindrical projecting portion integrally projecting upward from the annular upper surface on a radially inner peripheral side and an outer peripheral-side cylindrical projecting portion integrally projecting upward from the annular upper surface on a radially outer peripheral side. In this case, the thrust sliding bearing piece is disposed between the inner peripheral-side cylindrical projecting portion and the outer peripheral-side cylindrical projecting portion. Further, alternatively or additionally, as in the strut sliding bearing in accordance with a fourth aspect of the invention, the upper casing includes an inner peripheral-side cylindrical suspended portion integrally suspended downward from the annular lower surface on the radially inner peripheral side and an outer peripheral-side cylindrical suspended portion integrally suspended downward from the annular lower surface on a radially outer peripheral side. In this case as well, the thrust sliding bearing piece is disposed between the inner peripheral-side cylindrical suspended portion and the outer peripheral-side cylindrical suspended portion.

According to the strut sliding bearing in accordance with the third and fourth aspects, since the thrust sliding bearing piece can be positioned by the inner peripheral-side cylindrical projecting portion and the outer peripheral-side cylindrical projecting portion or by the inner peripheral-side cylindrical suspended portion and the outer peripheral-side cylindrical suspended portion, the thrust force can be received reliably by the thrust sliding bearing piece. In the case where the inner peripheral-side cylindrical suspended portion and the outer peripheral-side cylindrical suspended portion are provided in addition to the inner peripheral-side cylindrical projecting portion and the outer peripheral-side cylindrical projecting portion, a preferable labyrinth can be formed by them. Accordingly, it is possible to more effectively prevent the entry of dirt, rain water, and the like into a space between the lower casing and the upper casing where the thrust sliding bearing piece is fitted.

As in the strut sliding bearing in accordance with a fifth aspect of the invention, the lower casing preferably includes an annular base portion; an upper cylindrical portion which is integrally formed on an upper surface of the annular base portion and on which the annular upper surface is formed; and a lower cylindrical portion formed integrally on a lower surface of the annular base portion. In this case, the lower surface of the annular base portion on a radially outer side of the lower cylindrical portion serves as the spring seat surface.

According to the strut sliding bearing in accordance with the fifth aspect, as a result of the fact that the one end portion of the suspension coil spring can be held by the lower cylindrical portion with respect to the radial direction, it is possible to prevent the dislocation of the one end portion of the suspension coil spring from the spring seat surface.

In a preferred example, as in the strut sliding bearing in accordance with a sixth aspect of the invention, the upper casing includes an upper annular portion on which the annular lower surface is formed and a cylindrical portion extended integrally downward from a radially outer peripheral edge of the upper annular portion, and the lower casing includes an annular base portion, an upper cylindrical portion which is integrally formed on a radially substantially central portion of an upper surface of the annular base portion and on which the annular upper surface is formed, and a lower cylindrical portion formed integrally on a lower surface of the annular base portion, the upper cylindrical portion being surrounded by the cylindrical portion of the upper casing, a lower surface of the annular base portion on a radially outer side of the lower cylindrical portion serving as the spring seat surface.

According to the strut sliding bearing in accordance with the sixth aspect, since the upper cylindrical portion is formed integrally on the radially substantially central portion of the upper surface of the annular base portion, and is surrounded by the cylindrical portion of the upper casing, a lower gap between the cylindrical portion of the upper casing and the upper cylindrical portion of the lower casing can be covered by the annular base portion. As a result, it is possible to effectively prevent the entry of dirt, rain water, and the like into a gap between the cylindrical portion of the upper casing and the upper cylindrical portion of the lower casing through the lower gap.

As in the strut sliding bearing in accordance with a seventh aspect of the invention, the strut sliding bearing in accordance with the sixth aspect may also further comprise a tubular radial sliding bearing piece. In this case, the upper cylindrical portion of the lower casing has a cylindrical side surface opposed to a cylindrical side surface of the cylindrical portion of the upper casing, and the radial sliding bearing piece is interposed between the cylindrical side surface of the cylindrical portion of the upper casing and the cylindrical side surface of the upper cylindrical portion of the lower casing.

The synthetic resin of which the thrust sliding bearing piece and the radial sliding bearing piece are made should preferably possesses particularly self-lubricity. Preferably, as in the strut sliding bearing in accordance with an eighth aspect of the invention, in the strut sliding bearing in accordance with the second or seventh aspect, the radial sliding bearing piece is formed of a synthetic resin including at least one of polyacetal resin, polyamide resin, thermoplastic polyester resin, polyolefin resin, and fluororesin.

As in the strut sliding bearing in accordance with a ninth aspect of the invention, the upper casing is preferably adapted to be resiliently fitted and secured to the lower casing.

The synthetic resin of which the upper casing and the lower casing are made, which excels in the sliding characteristics such as wear resistance, impact resistance, and creep resistance as well as in mechanical characteristics such as rigidity, and which particularly exhibits preferable friction characteristics when combined with the synthetic resin used for the thrust sliding bearing piece should preferably be used. Specifically, as in the sliding bearing in accordance with a 10th aspect of the invention, it suffices if the upper casing is formed of a synthetic resin including at least one of polyacetal resin, polyamide resin, thermoplastic polyester resin, polyolefin resin, polycarbonate resin, and fluororesin. As in the sliding bearing in accordance with an 11th aspect of the invention, it suffices if the thrust sliding bearing piece is formed of a synthetic resin including at least one of polyacetal resin, polyamide resin, thermoplastic polyester resin, polyolefin resin, and fluororesin. As for the lower casing, a synthetic resin similar to the synthetic resin of which the upper casing is made could be used, but as in the sliding bearing in accordance with a 12th aspect of the invention, the lower casing is formed of a reinforced synthetic resin comprising a synthetic resin, including at least one of polyacetal resin, polyamide resin, and polypropylene resin, and reinforcing fibers contained in the synthetic resin. As the reinforcing fibers, it is possible to cite glass fibers, ceramic fibers, and the like, but other reinforcing fibers may be used.

The strut sliding bearing in accordance with the invention is for use in a strut-type suspension in a four-wheeled motor vehicle. Specifically, the strut sliding bearing in accordance with the invention is preferably interposed between a mounting member for a vehicle body and a suspension coil spring.

According to the present invention, it is possible to provide a strut sliding bearing which makes it possible to omit the upper spring seat member made of sheet metal, thereby making it possible to attain the light weight and a low price of the undercarriage of the motor vehicle.

Hereafter, a description will be given of the present invention and the mode for carrying out the invention with reference to the preferred embodiment shown in the drawings. It should be noted that the present invention is not limited to these embodiments.

BRIEF DESCRIPTION OF THE DRAWINGS

FIG. 1 is a cross-sectional view of a preferred embodiment of the invention;

BEST MODE FOR CARRYING OUT THE INVENTION

Figure 2:
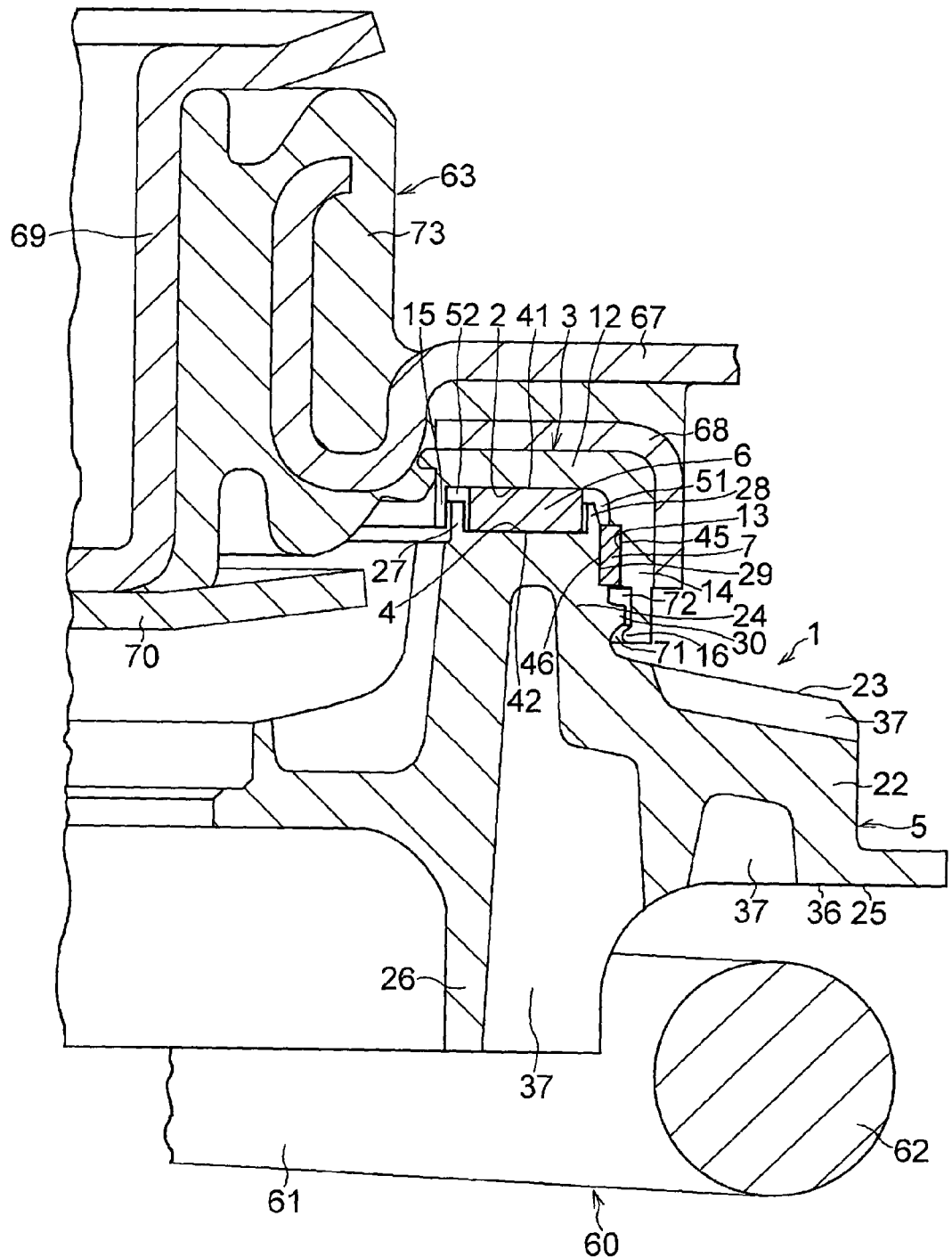
FIG. 2 is an enlarged cross-sectional view of a portion of the embodiment shown in FIG. 1.

In FIGS. 1 to 6, a thrust sliding bearing 1 for use in a strut-type suspension in a four-wheeled motor vehicle in accordance with this embodiment is comprised of an upper casing 3 which is made of a synthetic resin, for example, polyacetal resin, and has an annular lower surface 2; a lower casing 5 which is made of a reinforced synthetic resin including a synthetic resin, for example, polyacetal resin and reinforcing fibers such as glass fibers contained in this polyacetal resin, is superposed on the upper casing 3 so as to be rotatable about an axis O of the upper casing 3 in an R direction, and has an annular upper surface 4 opposed to the annular lower surface 2 of the upper casing 3; an annular thrust sliding bearing piece 6 which is made of a synthetic resin, for example, polyacetal resin, and is interposed between the annular lower surface 2 and the annular upper surface 4; and a tubular radial sliding bearing piece 7 made of a synthetic resin, for example, polyacetal resin.

Figure 3:
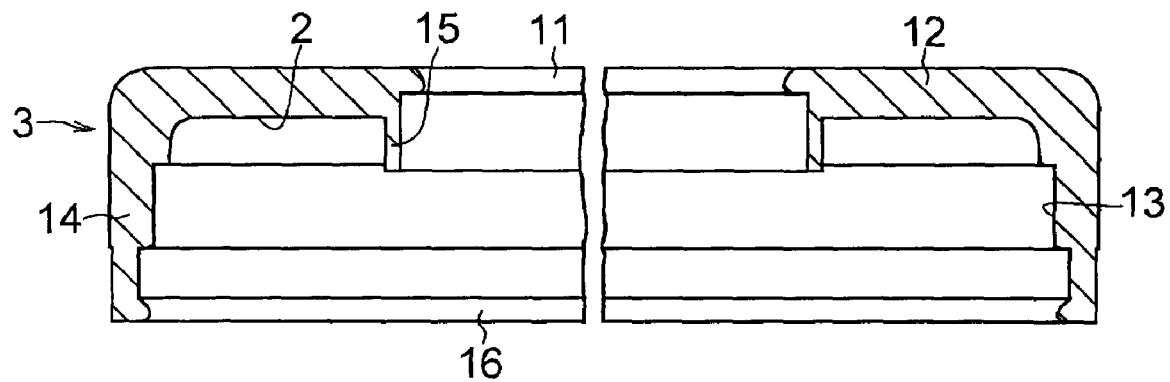
FIG. 3 is a cross-sectional view of an upper casing of the embodiment shown in FIG. 1.

As particularly shown in detail in FIG. 3, the annular upper casing 3 having a through hole 11 is integrally formed by including an upper annular portion 12 on which the annular lower surface 2 is formed; a cylindrical portion 14 extended integrally downward from a radially outer peripheral edge of the upper annular portion 12 and having a cylindrical side surface 13 on a radially inner side; an inner cylindrical suspended portion 15 suspended integrally downward from a radial inner peripheral edge of the upper annular portion 12; and an engaging hook portion 16 formed on the cylindrical side surface 13 on the radially inner side of the cylindrical portion 14.

Figure 4:
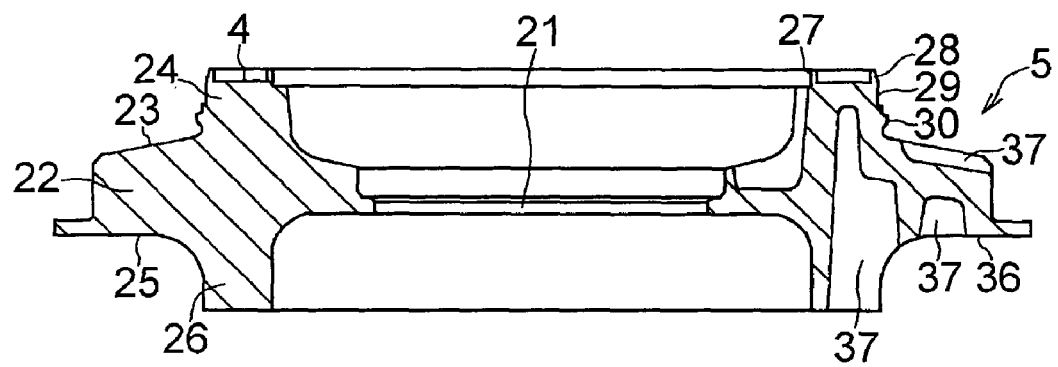
FIG. 4 is a cross-sectional view of a lower casing of the embodiment shown in FIG. 1.

As particularly shown in detail in FIG. 4, the annular lower casing 5 having a through hole 21 concentric with the through hole 11 is integrally formed by including an annular base portion 22; an upper cylindrical portion 24 which is integrally formed on a radially substantially central portion of an upper surface 23 of the annular base portion 22 and on which the annular upper surface 4 is formed, further, the upper cylindrical portion 24 having a cylindrical side surface 29 opposed to the cylindrical side surface 13 of the cylindrical portion 14 of the upper casing 3, an outer peripheral cylindrical surface of the upper cylindrical portion 24 has a diameter that is smaller than a diameter of an outer peripheral annular surface of the annular base portion 22 and an inner peripheral cylindrical surface of the upper cylindrical portion 24 has a diameter that is larger than an inner peripheral annular surface of the annular base portion 22; a lower cylindrical portion 26 formed integrally on a radially substantially central portion of a lower surface 25 of the annular base portion 22; an inner peripheral-side cylindrical projecting portion 27 integrally projecting upward from the annular upper surface 4 on a radially inner peripheral side, an outer peripheral cylindrical surface of the lower cylindrical portion 26 has a diameter that is smaller than the diameter of the outer peripheral annular surface of the annular base portion 22 and an inner peripheral cylindrical surface of the lower cylindrical portion 26 has a diameter that is larger than the inner peripheral annular surface of the annular base portion 22; an outer peripheral-side cylindrical projecting portion 28 integrally projecting upward from the annular upper surface 4 on a radially outer peripheral side; and an engaged hook portion 30 formed on the cylindrical side surface 29. The cylindrical side surface 13 is disposed radially inwardly of the cylindrical portion 14, while the cylindrical side surface 29 opposed to the cylindrical side surface 13 is disposed radially outwardly of the upper cylindrical portion 24.

The lower surface of the lower casing 5, i.e., the lower surface 25 of the annular base portion 22 on the radially outer side of the lower cylindrical portion 26, serves as a spring seat surface 36 for a suspension coil spring 61. The upper cylindrical portion 24 is surrounded by the cylindrical portion 14 of the upper casing 3, and a plurality of thinning cavities 37 are provided in the annular base potion 22, the upper cylindrical portion 24, and the lower cylindrical portion 26 so as to attain lightweight and the like.

Figure 5:
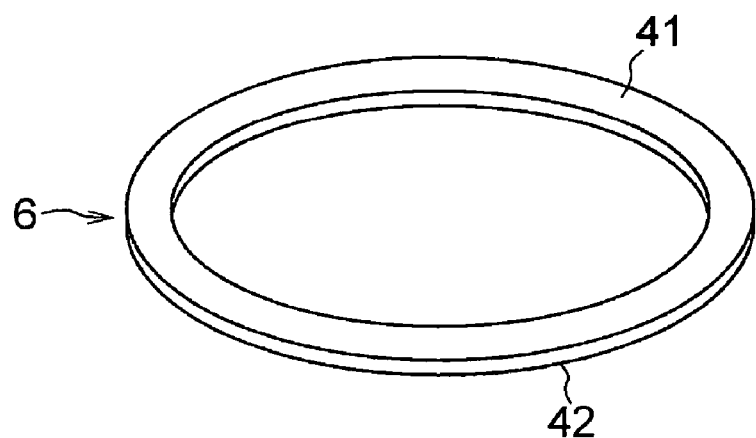
FIG. 5 is a perspective view of a thrust sliding bearing piece of the embodiment shown in FIG. 1.

As particularly shown in detail in FIG. 5, the thrust sliding bearing piece 6 is disposed between the inner cylindrical suspended portion 15 and the cylindrical portion 14 and between the inner peripheral-side cylindrical projecting portion 27 and the outer peripheral-side cylindrical projecting portion 28 in such a manner as to slidably contact the annular lower surface 2 at its annular upper surface 41 and the annular upper surface 4 at its annular lower surface 42, respectively.

Figure 6:
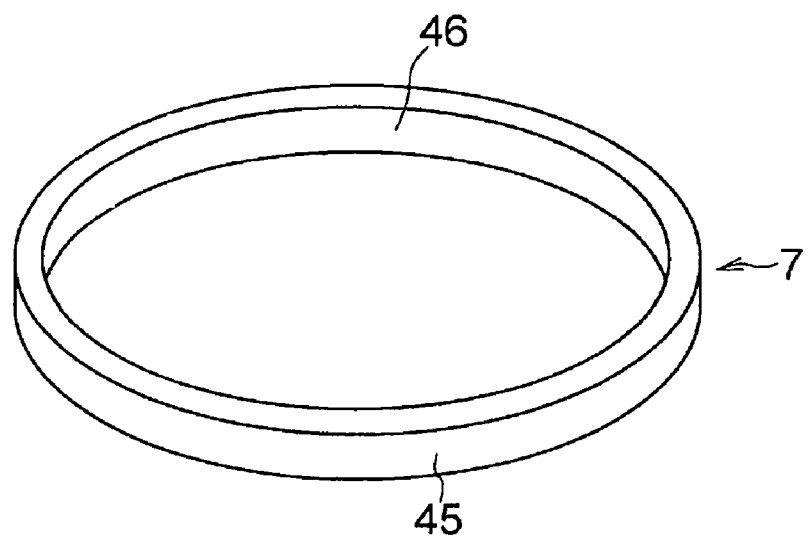
FIG. 6 is a perspective view of a radial sliding bearing piece of the embodiment shown in FIG. 1.

As particularly shown in detail in FIG. 6, the radial sliding bearing piece 7 is disposed between the cylindrical portion 14 of the upper casing 3 and the upper cylindrical portion 24 of the lower casing 5 in such a manner as to slidably contact the cylindrical side surface 13 at its cylindrical radially outer surface 45 and the cylindrical side surface 29 at its cylindrical radially inner surface 46, respectively.

The upper casing 3 is adapted to be resiliently fitted and secured to the lower casing 5 at the engaging hook portion 16 by being resiliently engaged in a snap-fit fashion with the engaged hook portion 30 of the lower casing 5.

In at least one portion of the radially outer peripheral edge portion and inner peripheral edge portion of the upper annular portion 12 and the upper cylindrical portion 24 of the upper casing 3 and the lower casing 5, i.e., in both edge portions in this embodiment, a labyrinth 51 is arranged to be formed between the upper annular portion 12 and the cylindrical portion 14 on the one hand, and the upper cylindrical portion 24 and the outer peripheral-side cylindrical projecting portion 28, on the other hand, while a labyrinth 52 is arranged to be formed between the upper annular portion 12 and the inner cylindrical suspended portion 15 on the one hand, and the inner peripheral-side cylindrical projecting portion 27, on the other hand. Entry of dust, muddy water, and the like from the outside into the annular space, where the thrust sliding bearing piece 6 is fitted between the upper annular portion 12 and the upper cylindrical portion 24, is prevented by such a labyrinth 51 at the outer peripheral edge portion and such a labyrinth 52 at the inner peripheral edge portion.

The above-described strut sliding bearing 1 is used by being interposed between one end portion 62 of the suspension coil spring 61 in a strut-type suspension assembly 60, as particularly shown in detail in FIGS. 1 and 2, and a mounting member 63 for mounting the strut-type suspension assembly 60 to a motor vehicle body of a four-wheeled motor vehicle.

The mounting member 63 on the motor vehicle body side where one end portion 65 of a piston rod 64 of a hydraulic damper in the strut-type suspension assembly 60 is supported includes a mounting plate 67 which is installed on the motor vehicle body of the four-wheeled motor vehicle by means of a screw 66; a receiving member 68 having substantially the same shape as that of the upper casing 3; a cylindrical member 69 where the one end portion 65 of the piston rod 64 is disposed; a seat plate 70 through which the one end portion 65 of the piston rod 64 is passed; and a resilient member 73 in which one end portion of the mounting plate 67 is embedded and to which the receiving member 68 and the cylindrical member 69 are vulcanized to integrate the mounting plate 67, the receiving member 68, and the cylindrical member 69. The one end portion 62 of the suspension coil spring 61 is seated on the spring seat surface 36.

In the strut-type suspension assembly 60 installed by means of the strut sliding bearing 1, as shown in FIGS. 1 and 2, the relative rotation of the lower casing 5 about the axis O in the R direction by means of the suspension coil spring 61 is smoothly effected by the relative sliding in the same direction between the upper surface 41 of the thrust sliding bearing piece 6 and the annular lower surface 2 of the upper casing 3 or the relative sliding in the same direction between the lower surface 42 of the thrust sliding bearing piece 6 and the annular upper surface 4 of the lower casing 5, as well as the relative sliding in the same direction between the inner surface 46 of the radial sliding bearing piece 7 and the cylindrical side surface 29 of the lower casing 5 or the relative sliding in the same direction between the outer surface 45 of the radial sliding bearing piece 7 and the cylindrical side surface 13 of the upper casing 3 during the steering operation.

According to the strut sliding bearing 1, since in addition to the upper casing 3, the thrust sliding bearing piece 6, and the radial sliding bearing piece 7, the lower casing 5 is also made of a synthetic resin, it is possible to attain light weight and a low price. Moreover, since the lower casing 5 has at its lower surface 25 the spring seat surface 36 for the suspension coil spring 61, the one end portion 62 of the suspension coil spring 61 can be received by the lower casing 5, making it possible to omit an upper spring seat member made of sheet metal. Thus, it is possible to eliminate a weight increase ascribable to the upper spring seat member made of sheet metal and a price increase ascribable to the fabrication, coating, and assembly of the upper spring seat member made of sheet metal. Coupled with the above-described advantages, it is possible to further attain the light weight and a low price of the undercarriage of the motor vehicle.

In addition, according to the strut sliding bearing 1, as a result of the fact that the radial force applied between the lower casing 5 and the upper casing 3 can be received by the radial sliding bearing piece 7, even if the radial force is applied, the relative rotation between the lower casing 5 and the upper casing 3 can be effected with low frictional resistance. Thus, the steering operation can be performed lightly. Furthermore, since the thrust sliding bearing piece 6 can be positioned by the inner peripheral-side cylindrical projecting portion 27 and the outer peripheral-side cylindrical projecting portion 28, the thrust force can be received reliably by the thrust sliding bearing piece 6. In addition, since the upper cylindrical portion 24 is formed integrally on the radially substantially central portion of the upper surface 23 of the annular base portion 22, and is surrounded by the cylindrical portion 14 of the upper casing 3, a lower gap 71 between the cylindrical portion 14 of the upper casing 3 and the upper cylindrical portion 24 can be covered by the annular base portion 22. As a result, it is possible to effectively prevent the entry of dirt, rain water, and the like into a gap 72 between the cylindrical portion 14 of the upper casing 3 and the upper cylindrical portion 24 through the lower gap 71. Moreover, as a result of the fact that the one end portion 62 of the suspension coil spring 61 can be held by the lower cylindrical portion 26 with respect to the radial direction, it is possible to prevent the dislocation of the one end portion 62 of the suspension coil spring 61 from the spring seat surface 36.

Figure 3A:
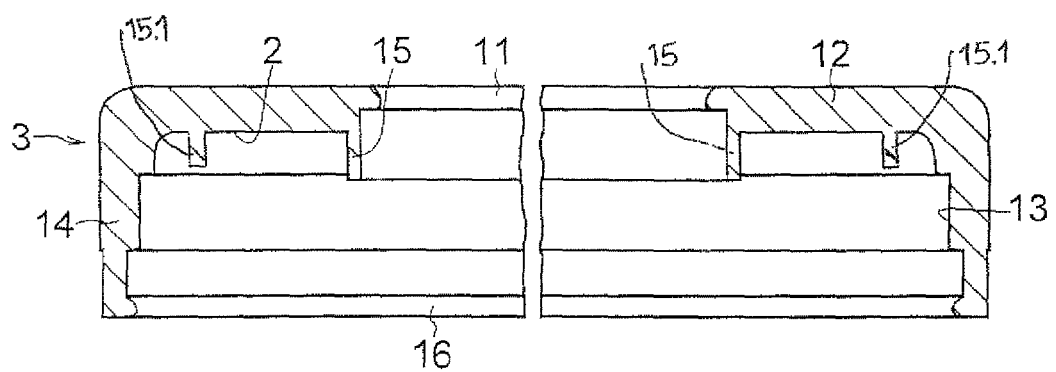
FIG. 3A is a cross-sectional view of an upper casing according to an alternate embodiment.

Although with the strut sliding bearing 1 the lower casing 5 is constructed by including the inner peripheral-side cylindrical projecting portion 27 and the outer peripheral-side cylindrical projecting portion 28, alternatively or additionally, the strut sliding bearing 1 may be constructed by arranging the upper casing 3 by including an inner peripheral-side cylindrical suspended portion 15 which is similar to the inner peripheral-side cylindrical projecting portion 27 and is integrally suspended downward from the annular lower surface 2 on the radially inner peripheral side, as well as an outer peripheral-side cylindrical suspended portion 15.1 (FIG. 3A) which is similar to the outer peripheral-side cylindrical projecting portion 28 and is integrally suspended downward from the annular lower surface 2 on the radially outer peripheral side, and by disposing the thrust sliding bearing piece 6 between the inner peripheral-side cylindrical suspended portion 15 and the outer peripheral-side cylindrical suspended portion 15.1.

The invention claimed is:
1. A strut sliding bearing comprising:
an upper casing made of a synthetic resin and having an annular lower surface;
a lower casing which is made of a synthetic resin, is superposed on said upper casing so as to be rotatable about an axis of said upper casing, and has an annular upper surface opposed to the annular lower surface of said upper casing; and
an annular thrust sliding bearing piece which is made of a synthetic resin, and is interposed between the annular lower surface of the upper casing and the annular upper surface of the lower casing, said annular thrust sliding bearing piece having an upper surface which is in slidable contact with the annular lower surface of the upper casing, and a lower surface which is in slidable contact with the annular upper surface of the lower casing,
wherein said lower casing is configured in one-piece and has on a lower surface thereof a spring seat surface for a suspension coil spring,
said lower casing includes an annular base portion, an upper cylindrical portion which is integrally formed on a radially substantially central portion of an upper surface of the annular base portion and on which the annular upper surface of the lower casing is formed, said upper cylindrical portion having an outer peripheral cylindrical surface with a diameter that is smaller than a diameter of an outer peripheral annular surface of the annular base portion, and said upper cylindrical portion having an inner peripheral cylindrical surface with a diameter that is larger than an inner peripheral annular surface of the annular base portion, and a lower cylindrical portion which is integrally formed on a radially substantially central portion of a lower surface of the annular base portion, said lower cylindrical portion having an outer peripheral cylindrical surface with a diameter that is smaller than the diameter of the outer peripheral annular surface of the annular base portion, and said lower cylindrical portion having an inner peripheral cylindrical surface with a diameter that is larger than the diameter of the inner peripheral annular surface of the annular base portion, said lower surface of the annular base portion on a radially outer side of the lower cylindrical portion serving as the spring seat surface,
the annular base portion, the upper cylindrical portion, and the lower cylindrical portion including a plurality of thinning cavities, each of which opens externally at said lower surface of the annular base portion or a lower surface of the lower cylindrical portion.

2. The strut sliding bearing according to claim 1, further comprising: a tubular radial sliding bearing piece,
wherein said upper casing includes an upper annular portion on which the annular lower surface is formed and a cylindrical portion extended integrally downward from a radially outer peripheral edge of the upper annular portion and having a cylindrical inner side surface, said outer peripheral cylindrical surface of said lower cylindrical portion opposing the cylindrical inner side surface of said cylindrical portion of the upper casing, said radial sliding bearing piece being interposed between the cylindrical inner side surface of the cylindrical portion of said upper casing and said outer peripheral cylindrical surface of said lower cylindrical portion.

3. The strut sliding bearing according to claim 2, wherein said radial sliding bearing piece is formed of a synthetic resin including at least one of polyacetal resin, polyamide resin, thermoplastic polyester resin, polyolefin resin, and fluororesin.

4. The strut sliding bearing according to claim 1, wherein said lower casing includes an inner peripheral-side cylindrical projecting portion integrally projecting upward from the annular upper surface on a radially inner peripheral side and an outer peripheral-side cylindrical projecting portion integrally projecting upward from the annular upper surface on a radially outer peripheral side, said thrust sliding bearing piece being disposed between the inner peripheral-side cylindrical projecting portion and the outer peripheral-side cylindrical projecting portion.

5. The strut sliding bearing according to claim 1, wherein said upper casing includes an inner peripheral-side cylindrical suspended portion integrally suspended downward from a radially inner peripheral side of the annular lower surface and an outer peripheral-side cylindrical suspended portion integrally suspended downward from a radially outer peripheral side of the annular lower surface, said thrust sliding bearing piece being disposed between the inner peripheral-side cylindrical suspended portion and the outer peripheral-side cylindrical suspended portion.

6. The strut sliding bearing according to claim 1, wherein said upper casing includes an upper annular portion on which the annular lower surface is formed and a cylindrical portion extended integrally downward from a radially outer peripheral edge of the upper annular portion, and the upper cylindrical portion being surrounded by the cylindrical portion of said upper casing.

7. The strut sliding bearing according to claim 6, further comprising: a tubular radial sliding bearing piece,
wherein said outer peripheral cylindrical surface of the upper cylindrical portion of said lower casing oppose a cylindrical inner side surface of the cylindrical portion of said upper casing, said radial sliding bearing piece being interposed between the cylindrical inner side surface of the cylindrical portion of said upper casing and the outer peripheral cylindrical surface of the upper cylindrical portion of said lower casing.

8. The strut sliding bearing according to claim 1, wherein said upper casing is adapted to be resiliently fitted and secured to said lower casing.

9. The strut sliding bearing according to claim 1, wherein said upper casing is formed of a synthetic resin including at least one of polyacetal resin, polyamide resin, thermoplastic polyester resin, polyolefin resin, polycarbonate resin, and fluororesin.

10. The strut sliding bearing according to claim 1, wherein said thrust sliding bearing piece is formed of a synthetic resin including at least one of polyacetal resin, polyamide resin, thermoplastic polyester resin, polyolefin resin, and fluororesin.

11. The strut sliding bearing according to claim 1, wherein said lower casing is formed of a reinforced synthetic resin comprising a synthetic resin, including at least one of polyacetal resin, polyamide resin, and polypropylene resin, and reinforcing fibers contained in the synthetic resin.

12. The strut sliding bearing according to claim 1 for use in a strut-type suspension in a four-wheeled motor vehicle.

13. A strut-type suspension structure in a four-wheeled motor vehicle, comprising: the strut sliding bearing according to claim 1 and a suspension coil spring seated at one end thereof on a spring seat surface of said lower casing.

14. The strut sliding bearing of claim 1, wherein the lower cylindrical portion of the lower casing extends into an inner diameter of the suspension coil spring when the suspension coil is engaged with the spring seat surface.

15. The strut sliding bearing of claim 1, wherein the plurality of thinning cavities are included asymmetrically in the lower cylindrical portion.

16. A strut sliding bearing comprising:
an upper casing made of a synthetic resin and having an annular lower surface;
a lower casing which is made of a synthetic resin, is superposed on said upper casing so as to be rotatable about an axis of said upper casing, and has an annular upper surface opposed to the annular lower surface of said upper casing; and
an annular thrust sliding bearing piece which is made of a synthetic resin, and is interposed between the annular lower surface of the upper casing and the annular upper surface of the lower casing, said annular thrust sliding bearing piece having an upper surface which is in slidable contact with the annular lower surface of the upper casing, and a lower surface which is in slidable contact with the annular upper surface of the lower casing,
wherein said lower casing is configured in one-piece and has on a lower surface thereof a spring seat surface for a suspension coil spring,
said lower casing includes an annular base portion, an upper cylindrical portion which is integrally formed on a radially substantially central portion of an upper surface of the annular base portion and on which the annular upper surface of the lower casing is formed, and a lower cylindrical portion which is integrally formed on a radially substantially central portion of a lower surface of the annular base portion, said lower surface of the annular base portion on a radially outer side of the lower cylindrical portion serving as the spring seat surface,
the annular base portion, the upper cylindrical portion, and the lower cylindrical portion including a plurality of thinning cavities, each of which opens externally at said lower surface of the annular base portion or a lower surface of the lower cylindrical portion,
wherein the plurality of thinning cavities are included asymmetrically in the lower cylindrical portion.

17. The strut sliding bearing of claim 16, wherein the lower cylindrical portion of the lower casing extends into an inner diameter of the suspension coil spring when the suspension coil is engaged with the spring seat surface.

* * * * *